(12) United States Patent
Han

(10) Patent No.: US 12,165,245 B2
(45) Date of Patent: Dec. 10, 2024

(54) METHOD AND APPARATUS FOR GENERATING SPECIAL EFFECT CONFIGURATION FILE, DEVICE, AND MEDIUM

(71) Applicant: BEIJING ZITIAO NETWORK TECHNOLOGY CO., LTD., Beijing (CN)

(72) Inventor: Xuyue Han, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/471,616

(22) Filed: Sep. 21, 2023

(65) Prior Publication Data

US 2024/0013459 A1    Jan. 11, 2024

Related U.S. Application Data

(63) Continuation of application No. PCT/CN2022/088903, filed on Apr. 25, 2022.

(30) Foreign Application Priority Data

Apr. 25, 2021  (CN) .......................... 202110448387.7

(51) Int. Cl.
*G06T 11/60* (2006.01)
*G06F 3/0482* (2013.01)
*G06F 3/0486* (2013.01)

(52) U.S. Cl.
CPC ............ *G06T 11/60* (2013.01); *G06F 3/0482* (2013.01); *G06F 3/0486* (2013.01)

(58) Field of Classification Search
CPC ....... G06T 11/60; G06F 3/0482; G06F 3/0486
See application file for complete search history.

(56) References Cited

U.S. PATENT DOCUMENTS

2003/0206316 A1* 11/2003 Anderson ............... G06T 11/60
358/1.18
2005/0219384 A1* 10/2005 Herberger ............ H04N 1/3871
382/284

(Continued)

FOREIGN PATENT DOCUMENTS

CN    106331526 A    1/2017
CN    108259496 A    7/2018

(Continued)

OTHER PUBLICATIONS

DrHeals, "Create custom overlays in Canva for Free", https://www.youtube.com/watch?v=Frcl8hl69sE, Sep. 24, 2020. (Year: 2020).*

(Continued)

*Primary Examiner* — Michelle L Sams
(74) *Attorney, Agent, or Firm* — Astute IP Law Group

(57) ABSTRACT

A method for generating an effect configuration file includes: displaying a layer list, wherein different layers in the layer list are used for indicating different effect materials; in response to a selection operation on a first layer in the layer list, displaying a first effect material indicated by the first layer on an editing interface of the effect materials, and in response to an editing operation on the first effect material on the editing interface, adjusting the state of the first effect material according to the editing operation; in response to a sorting adjustment operation on the layer list, adjusting the sorting of each layer in the layer list according to the sorting adjustment operation; and in response to a generation instruction of an effect configuration file, generating the effect configuration file according to the layer list.

20 Claims, 7 Drawing Sheets

(56) References Cited

U.S. PATENT DOCUMENTS

| | | | |
|---|---|---|---|
| 2007/0057971 A1* | 3/2007 | Bychkov | H04N 1/4433 345/629 |
| 2008/0036789 A1* | 2/2008 | de Leon | H04N 1/00183 345/625 |
| 2017/0329502 A1 | 11/2017 | Wu | |
| 2018/0005420 A1* | 1/2018 | Bondich | G06V 40/176 |
| 2018/0075523 A1 | 3/2018 | Odizzio et al. | |
| 2018/0075524 A1* | 3/2018 | Sartori Odizzio | G06F 3/04845 |
| 2019/0243531 A1 | 8/2019 | Chou et al. | |
| 2020/0285858 A1 | 9/2020 | Xu et al. | |
| 2020/0329272 A1 | 10/2020 | Xu et al. | |

FOREIGN PATENT DOCUMENTS

| | | |
|---|---|---|
| CN | 108388434 A | 8/2018 |
| CN | 108711180 A | 10/2018 |
| CN | 110111279 A | 8/2019 |
| CN | 111282277 A | 6/2020 |
| CN | 112184856 A | 1/2021 |
| CN | 112507661 A | 3/2021 |

OTHER PUBLICATIONS

Adobe.com, "Photoshop Elements Help", https://web.archive.org/web/20140102171350/https://helpx.adobe.com/photoshop-elements/using/copying-arranging-layers.html, Jan. 2, 2014. (Year: 2014).*

Dayton, Linnea and Jack Davis, "The Photoshop 5/5.5 WOW! Book", Peachpit Press, 2000, p. 79-84 (Year: 2000).*

Photoshopessentials.com, "Photoshop Layers Essential Shortcuts", https://www.photoshopessentials.com/basics/photoshop-layers-essential-shortcuts, Jan. 26, 2017 (Year: 2017).*

International Search Report (with English translation) and Written Opinion issued in PCT/CN2022/088903, dated Jul. 19, 2022, 10 pages provided.

The extended European search report issued in European Application No. 22794832.0, dated Sep. 17, 2024.

* cited by examiner

METHOD AND APPARATUS FOR GENERATING SPECIAL EFFECT CONFIGURATION FILE, DEVICE, AND MEDIUM

The present disclosure is a continuation of International Application No. PCT/CN2022/088903, filed on Apr. 25, 2022 which claims the priority to a Chinese patent application No. 202110448387.7, titled "METHOD AND APPARATUS FOR GENERATING SPECIAL EFFECT CONFIGURATION FILE, DEVICE, AND MEDIUM" and filed on Apr. 25, 2021 with the China National Intellectual Property Administration, both of which are incorporated herein by reference in their entireties.

TECHNICAL FIELD

The present disclosure relates to the field of computer technology, in particular to a method and an apparatus for generating an effect profile, a device, and a medium.

BACKGROUND

With the continuous development of internet technology and intelligent terminal technology, intelligent terminals can provide users with various types of effect functions.

Currently, the generation of effect profiles corresponding to effect functions is relatively complex, and is time-consuming and inefficient.

SUMMARY OF THE INVENTION

In order to solve or at least partially solve the above technical problems, a method and an apparatus for generating an effect profile, a device, and a medium are provided according to embodiments of the present disclosure.

A method for generating an effect profile is provided according to the embodiments of present disclosure. The method includes:
  displaying a layer list, where different layers in the layer list indicate different effect materials;
  displaying a first effect material indicated by a first layer on an editing interface for the effect material in response to a selection operation for the first layer in the layer list; and adjusting a state of the first effect material according to an editing operation, in response to the editing operation for the first effect material on the editing interface;
  adjusting sorting of layers in the layer list according to a sorting adjustment operation, in response to the sorting adjustment operation for the layer list; and
  generating an effect profile according to the layer list in response to a generation instruction of an effect profile, where the effect profile is configured to perform effect configuration on an original image in an image capturing process, to add the effect materials of the layers in the layer list onto the original image, and generate a captured target image for outputting; in the target image, the effect materials of the layers in the layer list are rendered and presented according to states of the effect materials of the layers in the layer list, and a level order of rendering the effect materials of the layers in the layer list is the same as the sorting of the layers in the layer list.

An apparatus for generating an effect profile is provided according to the embodiments of present disclosure. The apparatus includes:
  a layer list module configured to display a layer list, wherein different layers in the layer list indicate different effect materials;
  an editing module configured to display a first effect material indicated by a first layer on an editing interface for the effect material in response to a selection operation for the first layer in the layer list, and adjust a state of the first effect material according to an editing operation, in response to the editing operation for the first effect material on the editing interface;
  a sorting adjustment module configured to adjust sorting of layers in the layer list according to a sorting adjustment operation, in response to the sorting adjustment operation for the layer list;
  a file generation module configured to generate an effect profile according to the layer list in response to a generation instruction of the effect profile; and
  where the effect profile is configured to perform effect configuration on an original image in an image capturing process, to add the effect materials of the layers in the layer list onto the original image, and generate a captured target image for outputting; in the target image, the effect materials of the layers in the layer list are rendered and presented according to states of the effect materials of the layers in the layer list, and a level order of rendering the effect materials of the layers in the layer list is the same as the sorting of the layers in the layer list.

An electronic device is also provided according to the embodiments of present disclosure. The electronic device includes a processor and a memory for storing instructions executable by the processor. The processor is configured to read the executable instructions from the memory, and execute the instructions to implement the method for generating the effect profile according to the embodiments of present disclosure.

A computer readable storage medium storing a computer program is also provided according to the embodiments of present disclosure. The computer program is configured to implement the method for generating the effect profile according to the embodiments of present disclosure.

A computer program product including a computer program/instruction is also provided according to the embodiments of present disclosure. The computer program/instruction, when executed by a processor, performs the method for generating the effect profile according to any of embodiments of present disclosure.

The technical solution according to the embodiments of present disclosure has the following advantages compared to the conventional technology. In the solution of generating the effect profile according to the embodiments of the present disclosure, the layer list is displayed, where different layers in the layer list indicate different effect materials. The first effect material indicated by the first layer is displayed on the editing interface for the effect material in response to the selection operation for the first layer in the layer list, and the state of the first effect material is adjusted according to the editing operation in response to the editing operation for the first effect material on the editing interface. The sorting of the layers in the layer list is adjusted according to the sorting adjustment operation in response to the sorting adjustment operation for the layer list. The effect profile is generated according to the layer list in response to the generation instruction of the effect profile. The effect profile is configured to perform effect configuration on the original image in the image capturing process, to add the effect materials of the layers in the layer list onto the original image and generate the captured target image for outputting. In the target image, the effect materials of the layers in the layer list are rendered and presented according to the states of the effect materials of the layers in the layer list. The level order of rendering the effect materials of the layers in the layer list is the same as the sorting of the layers in the layer list. With the above technical solution, the states of the effect materials in the effect profile may be edited and the level order of rendering the effect materials in the effect profile may be adjusted by introducing the layer and the layer list, thereby quickly and conveniently generating the effect profile, reducing understanding costs, shortening the generation time of the effect profile, and improving the production efficiency of the effect profile.

BRIEF DESCRIPTION OF THE DRAWINGS

The above and other features, advantages and aspects of the embodiments of the present disclosure will be more apparent in conjunction with the drawings and with reference to the following embodiments. The same or similar reference numerals throughout the drawings represent the same or similar elements. It should be understood that the drawings are schematic and the components and elements are unnecessarily drawn to scale.

DETAILED DESCRIPTION OF EMBODIMENTS

Figure 1:
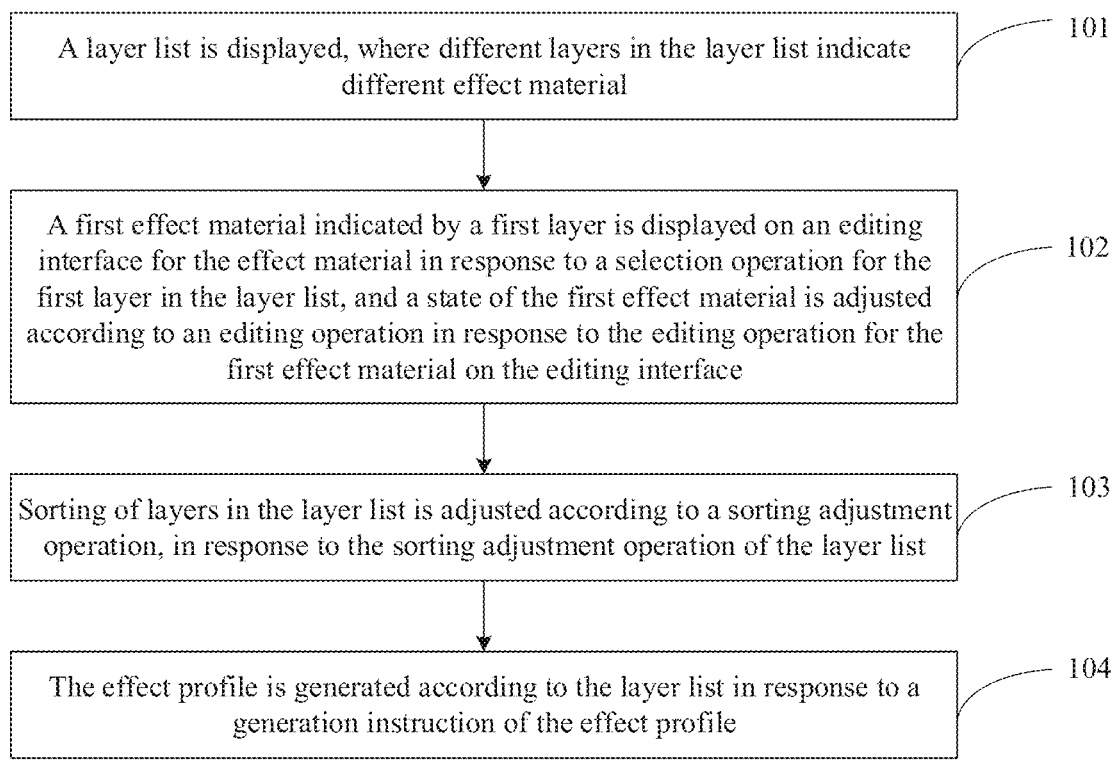
FIG. 1 is a schematic flowchart of a method for generating an effect profile according to an embodiment of the present disclosure.

Embodiments of the present disclosure are described in detail below with reference to the drawings. Although some embodiments of the present disclosure are shown in the drawings, it should be understood that the present disclosure may be implemented in various forms and should not be construed as being limited to the embodiments described herein. The embodiments are provided for thoroughly and completely understanding the present disclosure. It should be understood that the drawings and the embodiments of the present disclosure are only illustrative of the disclosure, and are not intended to limit the protection scope of the present disclosure.

It should be understood that the steps in the method embodiment of the present disclosure may be performed in different orders and/or in parallel. In addition, the method embodiment may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the embodiments of the present disclosure are used to distinguish different apparatuses, modules or units, and are not used to limit an sequential order or interdependence of the functions performed by the apparatuses, modules or units.

It should be noted that the modifications such as "one" and "multiple" mentioned in the embodiments of the present disclosure are illustrative and not restrictive. Those skilled in the art should understand that the modifications should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

FIG. 1 is a schematic flowchart of a method for generating an effect profile according to an embodiment of the present disclosure. The method may be executed by an apparatus for generating an effect profile. The apparatus may be implemented in software and/or hardware and may generally be integrated into an electronic device. As shown in FIG. 1, the method includes S101 to S104.

In Step 101, a layer list is displayed, where different layers in the layer list indicate different effect materials.

The method for generating the effect profile according to an embodiment of the present disclosure can be implemented by a creating tool for the effect profile in a terminal. The creating tool is used to edit, adjust, and generate the effect profile. Effect profile may be a profile for implementing effect functions, such as various types of interactive functions between a user and a terminal. Effect profile may be configured in various types of applications in the form of a plugin or a component, which is not limited herein.

The layer is a functional layer provided by the above creating tool for managing and editing the effect materials. The layer list includes at least one layer. One layer is used to indicate one effect material. That is, the effect material corresponds to the layer one by one. A effect material refers to a minimum element which is preset in the above creating tool for the effect profile and is used to form the effect profile. Different effect materials have different functions. The effect materials are not limited by the embodiments of the present disclosure. For example, the effect material may include at least one of makeup, a filter, an effect, a sticker and a text. One effect profile may be composed of one effect material or a combination of multiple effect materials, which is not limited herein.

In an embodiment of the present disclosure, when a user needs to create a effect profile, the terminal may start the creating tool for the effect profile and display the layer list. In one possible implementation, the layer list may be displayed by displaying the layer list in response to an adding operation of the effect material or a trigger operation on a layer key. The layer key may be a shortcut key used to control the layer list. After the creating tool is started, if no effect material has been added yet, the adding operation of the user for any effect material may be received. The layer list is displayed in response to this operation. The layer list includes a layer of the effect material. If effect material has already been added, a trigger operation of the user for the layer key may be received to display the layer list.

In step 102, a first effect material indicated by a first layer is displayed on an editing interface for the effect material in response to a selection operation for the first layer in the layer list, and a state of the first effect material is adjusted according to an editing operation in response to the editing operation for the first effect material on the editing interface.

The first layer may be any layer in the layer list. The editing interface for the effect material is an interface for editing the effect material. In the editing interface, multiple functional components may be provided to achieve editing of the effect material. The state of the effect material refers to a state of the effect material during rendering and displaying, and may include a size, a display position, a display style, etc.

In an embodiment of the present disclosure, after the layer list is displayed, a selection operation of the user for the first layer in the layer list is received. The specific form of the selection operation is not limited. For example, the selection operation may be a click operation for the first layer. Afterwards, the first effect material indicated by the first layer may be displayed on the editing interface for the effect material, and the state of the first effect material may be adjusted according to the editing operation of the user for the first effect material. For example, when the effect material is a sticker, the sticker is displayed in the editing interface in response to the selection operation of the user for the layer corresponding to the sticker. The size, style, and position of the sticker are adjusted according to the editing operation of the user.

In one possible implementation, the process of adjusting the state of the first effect material according to an editing operation in response to the editing operation for the first effect material on the editing interface includes: in response to a trigger operation for an editing component corresponding to the first effect material on the editing interface, adjusting the state corresponding to the editing component of the first effect material, where the number of editing component is at least one.

The editing interface includes one or more editing components preset for the first effect material. The state corresponding to the editing component of the first effect material is adjusted in response to receiving the trigger operation of the user for the editing component. The state of the first effect material changes with the editing operation. The change process is displayed to the user, so that the user can visually see an editing effect.

In one possible implementation, the editing component includes a trigger component. The state corresponding to the trigger component of the first effect material is a trigger event of the first effect material. The trigger event includes at least one of an appearance action, a disappearance action, and an initial state.

The above trigger component is one of the editing components, which is used to add the trigger event of the first effect material. After the user performs trigger operation on the trigger component in the editing component, a setting interface of the trigger component may be displayed. The setting interface may include an optional action corresponding to each trigger event. The user's selection for the optional action is received to set the trigger event. In an embodiment of the present disclosure, the trigger event may include at least one of an appearance action, a disappearance action, and an initial state. Each trigger event may include multiple optional actions, and a specific action may be selected.

In the above trigger event, setting the initial state is only supported after the appearance action and the disappearance action are set. The appearance action takes effect when the first effect material disappears, and the disappearance action takes effect when the first effect material appears. A loop is supported. When the initial state is "occurrence", setting the appearance action is not supported. The optional action may include multiple actions, which is not limited herein. For example, the optional action may include clicking on a screen, blinking, opening the mouth, pouting, shaking the head, nodding, eyebrow raising, appearing with one hand, appearing with two hands, a heart gesture with one hand, a heart gesture with two hands, an OK gesture, and a like gesture. As an example, when the first effect material is a sticker, a blinking of the user may be selected as the disappearance action of the sticker. The initial state includes two options: Yes and No. If the initial state is Yes, the sticker is displayed directly in the initial state, and then the sticker disappears when the user blinks.

In the above solution, various editing components corresponding to effect materials provided in the editing interface for the effect material may be used to adjust the state of the effect material, so that the user can quickly and conveniently edit and set the effect material, shortening the creation time, improving efficiency, and creating experience.

In step 103, sorting of layers in the layer list is adjusted according to a sorting adjustment operation, in response to the sorting adjustment operation of the layer list.

The sorting of the layers in the layer list is the same as a level order of rendering the effect materials of the layers in the layer list. The sorting of the layers in the layer list is determined based on the order in which the layers are added. The final added effect material has the highest rendering level, which may be applied onto each of previous effect materials. A sorting direction of the layers in the layer list is not limited in the embodiment of the present disclosure, which may be vertical or horizontal sorting.

In an embodiment of the present disclosure, the process of adjusting the sorting of the layers in the layer list according to the sorting adjustment operation in response to the sorting adjustment operation of the layer list may include: adjusting a sorting of a second layer according to a dragging position of a dragging operation in response to the dragging operation for the second layer in the layer list. The adjusted sorting position of the second layer is a dragging position to which the second layer is dragged in the layer list. The second layer may be any layer in the layer list, which may be the same or different from the first layer mentioned above.

The second layer may move along with the dragging operation in response to receiving the dragging operation of the user for the second layer in the layer list. The sorting position of the second layer is adjusted according to the dragging position when the dragging operation stops. The adjusted sorting position of the second layer is the dragging position to which the second layer is dragged in the layer list. The level order of rendering the second special effect material corresponding to the second layer is adjusted accordingly.

In the above solution, each effect material is implemented in the form of a layer, to form a layer list. In addition, the position sorting of the layers in the layer list corresponds to the level order of rendering the effect materials. This allows users to quickly adjust the level order of rendering the effect materials by adjusting the layer sorting, improving the adjustment efficiency.

In Step 104, the effect profile is generated according to the layer list in response to a generation instruction of the effect profile.

After the state of at least one effect material is edited and the layer sorting is adjusted, the generation instruction of the effect profile is received. All effect materials may be packaged based on the edited and/or adjusted at least one effect material, using a packaging function of the creating tool of the effect profile, to generate the effect profile and publish the generated effect profile. This effect profile may achieve a function set for each effect material included.

The effect profile is configured to perform effect configure on an original image in an image capturing process, so that the effect materials of the layers in the layer list are added onto the original image to generate a captured target image for outputting. In the target image, the effect materials of the layers in the layer list are rendered and presented according to the states of the effect materials of the layers in the layer list. The level order of rendering the effect materials of the layers in the layer list is the same as the sorting of the layers in the layer list.

The original image refers to an image on which no effect function is added. The target image refers to an image on which the effect function has been added. The effect profile is configured in an application. When the user activates the function corresponding to the effect profile, effect configuration may be performed on the original image in the image capturing process, to add the effect materials of the layers onto the original image based on the layer list and generate the target image and output the generated target image. In addition, the effect materials included in the effect profile in the target image are rendered and presented in the order of the layers in the layer list and in the pre-edited state. The level order of rendering each effect material is the same as the layer sorting of that effect material.

In the solution of generating the effect profile according to the embodiment of the present disclosure, the layer list is displayed, where different layers in the layer list indicate different effect materials. The first effect material indicated by the first layer is displayed on the editing interface for the effect material in response to the selection operation for the first layer in the layer list, and the state of the first effect material is adjusted according to the editing operation in response to the editing operation for the first effect material on the editing interface. The sorting of the layers in the layer list is adjusted according to the sorting adjustment operation in response to the sorting adjustment operation for the layer list. The effect profile is generated according to the layer list in response to the generation instruction of the effect profile. The effect profile is configured to perform effect configuration on the original image in the image capturing process, to add the effect materials of the layers in the layer list onto the original image and generate the captured target image for outputting. In the target image, the effect materials of the layers in the layer list are rendered and presented according to the states of the effect materials of the layers in the layer list. The level order of rendering the effect materials of the layers in the layer list is the same as the sorting of the layers in the layer list. With the above technical solution, the state of the effect material in the effect profile may be edited and the level order of rendering the effect material in the effect profile may be adjusted by introducing the layer and the layer list, thereby quickly and conveniently generating the effect profile, reducing understanding costs, shortening the generation time of the effect profile, and improving the production efficiency of the effect profile.

In some embodiments, the method for generating the effect profile may further include: hiding a third effect material indicated by a third layer on the editing interface for the effect material, in response to a hiding operation for the third layer in the layer list. The third effect material is hidden when the target image is rendered and presented. The third layer may be any layer in the layer list. The hiding operation may be a trigger operation for a preset hiding key. Each layer may be provided with a hiding key.

In response to receiving the trigger operation of the user for the hiding key corresponding to the third layer in the layer list, the third effect material is hidden on the editing interface for the effect material. That is, the third effect material is not displayed. After the target image is generated based on the effect profile, the third effect material in the target image is hidden. Moreover, the hidden third effect material may be displayed in response to receiving a second trigger operation of the user for the hiding key corresponding to the third layer.

In some embodiments, the method for generating the effect profile may further include: hiding the layer list in response to a hiding trigger operation for the layer list. In response to receiving a second trigger operation of the user on the above layer key for displaying the layer list, it can be determined that the hiding trigger operation on the layer list is received, and the layer list may be hidden. In response to detecting the trigger operation of the user for the layer key, the layer list may be hidden if it is already displayed, and the layer list may be displayed for subsequent editing if it is not displayed. The efficiency of managing the layer list by users has been improved by setting the layer key.

In the above solution, the effect material in the effect profile is edited and managed by means of the layer. On this basis, the layer list and the effect material of the layer in the layer list may also be hidden according to the actual needs during the creation, which is more helpful for users to manage the effect material.

Figure 2:
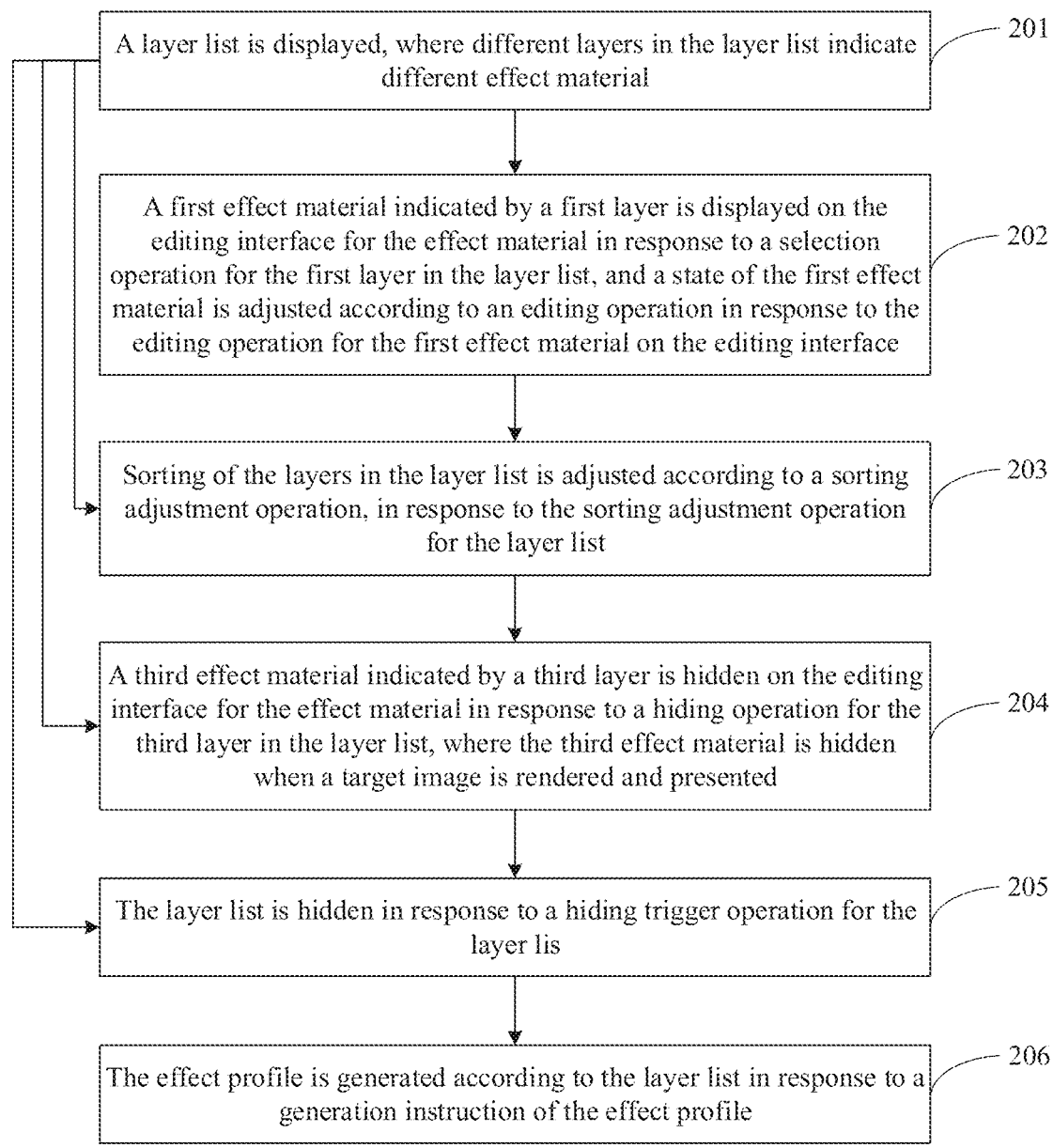
FIG. 2 is a schematic flowchart of a method for generating an effect profile according to another embodiment of the present disclosure.

FIG. 2 is a schematic flowchart of a method for generating an effect profile according to another embodiment of the present disclosure. Based on the above embodiment, the above method for generating the effect profile may further optimized according to the present embodiment. As shown in FIG. 2, the method includes S201 to S206.

In Step 201, a layer list is displayed, where different layers in the layer list indicate different effect materials.

The effect material includes at least one of makeup, a filter, a special effect, a sticker, and a text. In one possible implementation, a process of displaying a layer list includes displaying a layer list, in response to an adding operation of an effect material or in response to a trigger operation on a layer key.

Figure 3:
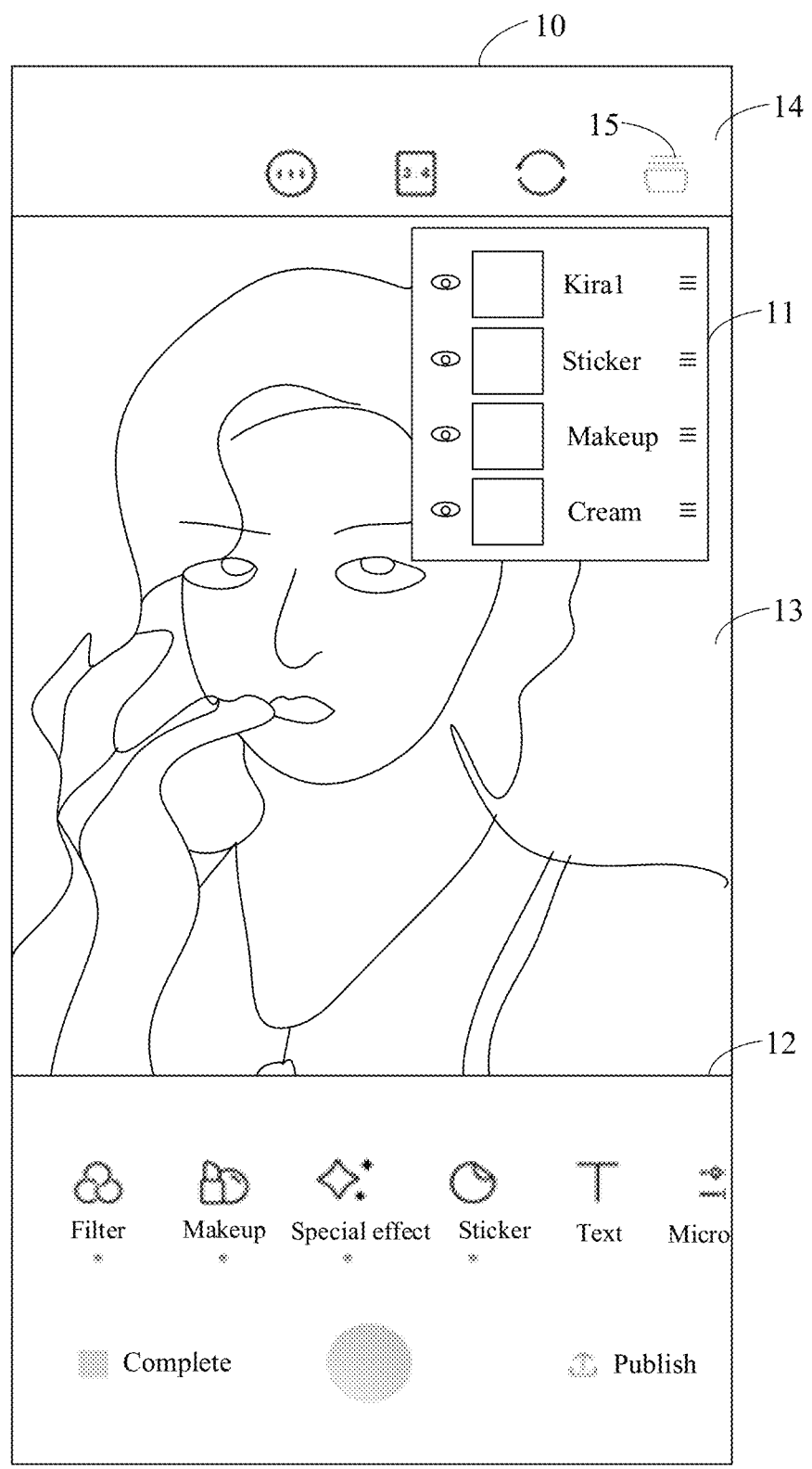
FIG. 3 is a schematic diagram of an editing interface according to an embodiment of the present disclosure.

For example, FIG. 3 is a schematic diagram of an editing interface according to an embodiment of the present disclosure. As shown in FIG. 3, an editing interface 10 for effect material is shown. A layer list 11, a first display area 12, and a second display area 13 are displayed on the editing interface 10. The layer list 11 shows four vertically sorted layers which correspond to the effect materials of "Kira1", a sticker, makeup, and a filter "cream", respectively. Multiple effect materials, such as a filter, makeup, a special effect, a sticker, a text, may be displayed in the first display area 12, as shown in FIG. 3. When no effect material has been added yet, the editing interface does not include the layer list 11. After the user adds at least one effect material through trigger operation in the display area 12, the layer list 11 may be created and displayed in the editing interface. An original image may be displayed in the second display area 13. The image may be a current user image collected in real time or an image selected by the user, which is not limited herein.

Referring to FIG. 3, a layer key 15 is displayed in a third display area 14 of the editing interface 10. The layer list may be displayed by the user triggering the layer key 15. In addition, other function keys, such as a proportion setting key and a refresh key as in FIG. 3, may also be displayed in the third display area 14 of the editing interface 10, which are only examples.

After Step 201, Steps 202, 203, 204, and/or 205 may be performed to achieve different functions. When multiple steps are included, the specific execution sequence is not limited, and the sequence in FIG. 2 is only an example.

In Step 202, a first effect material indicated by a first layer is displayed on the editing interface for the effect material in response to a selection operation for the first layer in the layer list, and a state of the first effect material is adjusted according to an editing operation in response to the editing operation for the first effect material on the editing interface.

In one possible implementation, the state of the first effect material is adjusted according to an editing operation in response to the editing operation for the first effect material on the editing interface includes: adjusting a state corresponding to an editing component of the first effect material, in response to a trigger operation for the editing component corresponding to the first effect material on the editing interface, where the number of editing component is at least one.

Figure 4:
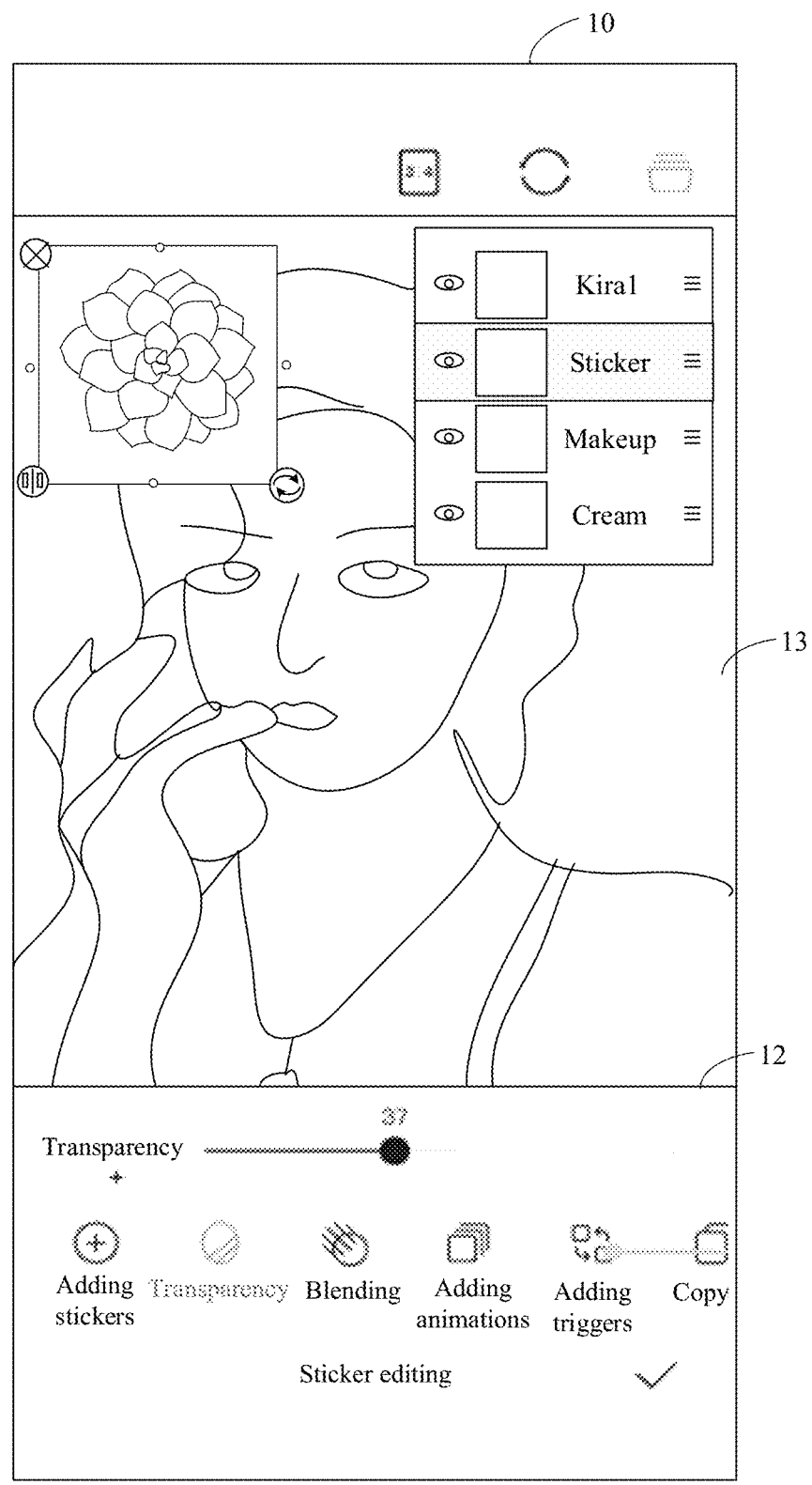
FIG. 4 is a schematic diagram of an editing interface according to another embodiment of the present disclosure.

For example, FIG. 4 is a schematic diagram of an editing interface according to another embodiment of the present disclosure. As shown in FIG. 4, a schematic diagram of an editing interface 10 for editing the effect material is shown. In FIG. 4, the first layer corresponding to the selection operation in the editing interface 10 is a sticker layer. The sticker layer is highlighted. The first effect material is a sticker. In the first display area 12, multiple editing components such as transparency, adding stickers, blending, adding animations, adding triggers, and copying as in FIG. 4 are displayed. Users can adjust the state of the sticker through the trigger operation for the editing component of the sticker. In addition, in the second display area 13 of the editing interface 10, the style of the sticker changes with editing. Moreover, a functional key may be provided at the periphery of the sticker For example, a delete key is provided on the top left corner of the sticker, a mirror key is provided on the bottom left corner of the sticker, and a refresh button is provided on the bottom right corner of the sticker as in FIG. 4, which are only examples.

In one possible implementation, the editing component includes a trigger component. The state corresponding to the trigger component of the first effect material is a trigger event of the first effect material. The trigger event includes at least one of an appearance action, a disappearance action, and an initial state.

Figure 5:
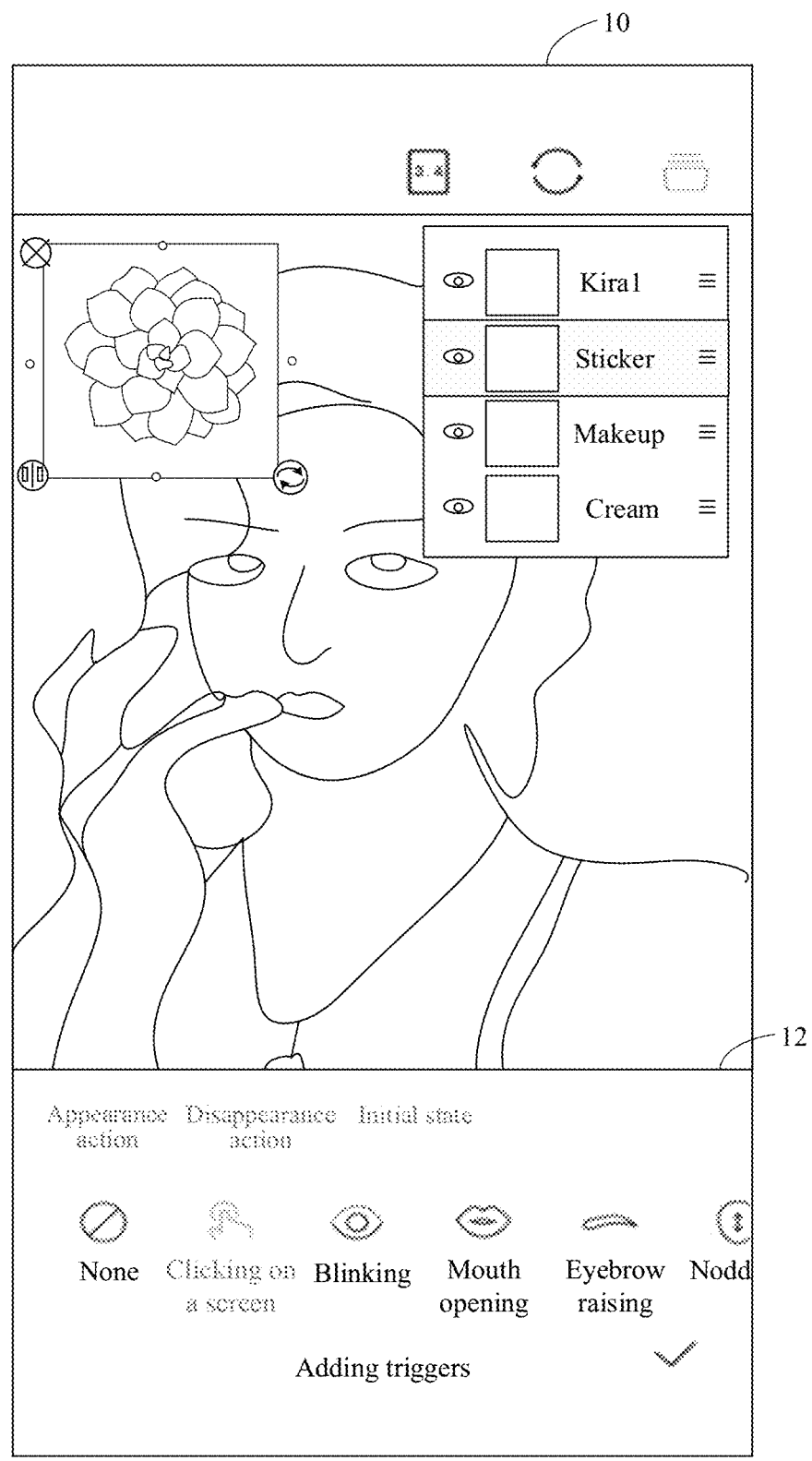
FIG. 5 is a schematic diagram of an editing interface according to still another embodiment of the present disclosure.

For example, FIG. 5 is a schematic diagram of an editing interface according to still another embodiment of the present disclosure. Referring to FIGS. 4 and 5, the "Adding Triggers" in the editing components of the sticker in FIG. 4 is the trigger component. After the user triggers the trigger component in FIG. 4, a setting interface for the trigger component may be displayed in the second display area 13 of the editing interface 10, as shown in FIG. 5. In the setting interface, the three trigger events, i.e., an appearance action, a disappearance action, and an initial state, may be set. In FIG. 5, an optional action in the appearance action is shown, which includes none, clicking on a screen, blinking, mouth opening, eyebrow raising, and nodding. The trigger event is set to "None" by default. The appearance action shown in FIG. 5 is set to clicking on a screen. That is, when the user clicks on a screen, the sticker is displayed.

In one possible implementation, the editing component may also include a playback setting component. When the first effect material is a dynamic image, such as a sequence frame or Graphics Interchange Format (GIF) sticker, the playback setting component may be displayed. The state corresponding to the playback setting component of the first effect material is a playback attribute. A setting interface for the playback setting component is displayed in response to a trigger operation on the playback setting component. The playback attribute of the first effect material is set based on the setting interface for the playback setting component. The playback attribute is used to set an infinite loop or the number of cycles. After the user clicks on the playback setting component, the infinite loop is selected by default. After the user selects the number of cycles, a quantity setting function is displayed on the right side. The number of cycle is selected by clicking on "Increase" or "Decrease". The default number of cycle is 1. The user can set the number of cycle according to the actual situation. For example, when the number of cycle of the first effect material is 1, in response to a trigger again after the playback is completed in response to a trigger, the first effect material will be played again. When the number of playback loop is the infinite loop, the first effect material will continue to appear in response to a trigger by the action, and another trigger is invalid.

In one possible implementation, the editing component may also include an animation addition component. When the first effect material is a sticker or a text, the animation addition component may be displayed. The state corresponding to the animation addition component of the first effect material is an animation attribute. A setting interface for the animation addition component is displayed in response to the trigger operation on the animation addition component. The animation attribute of the first effect material is set based on the setting interface for the animation addition component. The animation attribute may include a specific animation effect, an animation speed, etc. The animation effect may include trembling, flickering, heart beating, etc. The default selection is "None". The animation speed from fast to slow ranges from 0.1 s to 3 s. After the user triggers the animation addition component, the animation attribute may be set by selecting the animation effect on the setting interface for the animation addition component. After setting, animation playback preview may be performed on the first effect material.

In Step 203, sorting of the layers in the layer list is adjusted according to a sorting adjustment operation, in response to the sorting adjustment operation for the layer list.

In one possible implementation, a process of adjusting sorting of the layers in the layer list according to a sorting adjustment operation in response to the sorting adjustment operation for the layer list includes: adjusting sorting of a second layer according to a dragging position of a dragging operation, in response to the dragging operation for the second layer in the layer list. The adjusted sorting position of the second layer is the dragging position to which the second layer is dragged in the layer list.

As shown in FIG. 3, the layer list 11 displays four vertically sorted layers, which correspond to the effect materials of "Kira1", a sticker, makeup, and a filter "cream", respectively. Sorting of the layers in the layer list corresponds to a level order of rendering the effect materials of the layers, which is determined based on an order in which the effect materials are added. The layer corresponding to the recently added effect material is arranged at the top of the layer list 11, and is presented on the effect material of each below layer.

Figure 6:
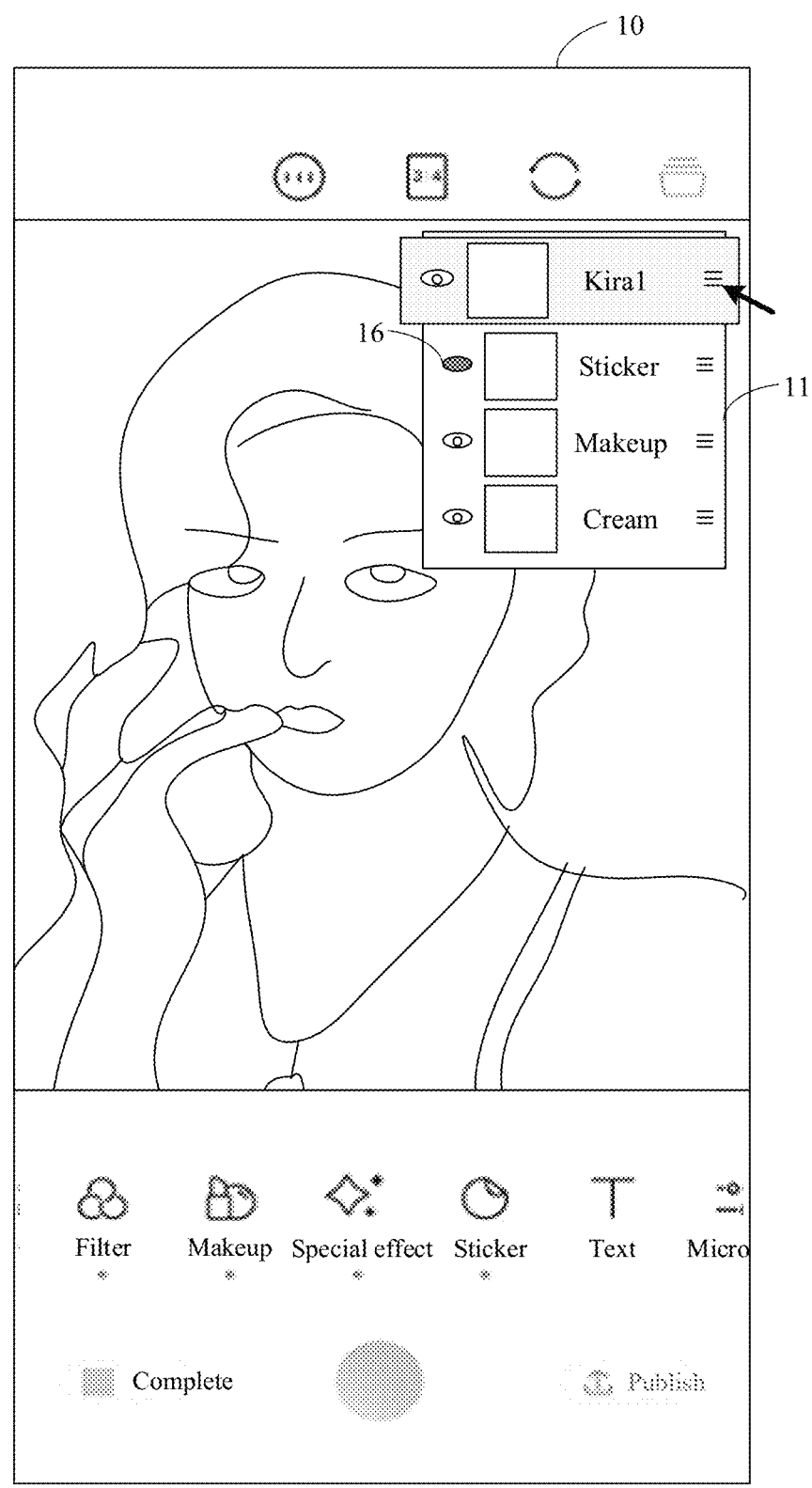
FIG. 6 is a schematic diagram of an editing interface according to yet another embodiment of the present disclosure.

For example, FIG. 6 is a schematic diagram of an editing interface according to yet another embodiment of the present disclosure. As shown in FIG. 6, the effect material corresponding to the first layer in the layer list 11 in the editing interface 10 is "Kira1". The user performs a dragging operation on the effect layer. An arrow in FIG. 6 represents the dragging operation. As shown in FIG. 6, the effect layer is highlighted and enlarged, indicating that this effect layer is being dragged. After the dragging operation of the user is completed, assuming that the dragging operation ends at the last layer, the effect layer is adjusted from the first position to the last position.

In Step 204, a third effect material indicated by a third layer is hidden on the editing interface for the effect material in response to a hiding operation for the third layer in the layer list. The third effect material is hidden when a target image is rendered and presented.

Referring to FIG. 6, the effect material corresponding to the second layer of the layer list 11 is a sticker. When the user triggers a hiding key 16 of the sticker layer, the hiding key 16 is highlighted, and the sticker is hidden in comparison to FIG. 4.

In Step 205, the layer list is hidden in response to a hiding trigger operation for the layer list.

As shown in FIG. 3, when the layer list is already displayed and the user triggers a layer key 15 in the editing interface 10, the layer list may be hidden. When the layer list has not been displayed and the user triggers the layer key 15, the layer list may be displayed.

In Step 206, the effect profile is generated according to the layer list in response to a generation instruction of the effect profile.

The effect profile is configured to perform effect configure on an original image in an image capturing process, to add the effect materials of the layers in the layer list onto the original image, and generate a captured target image for outputting. In the target image, the effect materials of the layers in the layer list are rendered and presented according to states of the effect materials of the layers in the layer list. The level order of rendering the effect materials of the layers in the layer list is the same as the sorting of the layers in the layer list.

After at least one effect material is edited, that is, after the above Steps 202, 203, 204, and/or 205, a creating tool for the effect profile packages the effect materials in response to the generation instruction of the effect profile, to generate an effect profile and publish the same. After each of above Steps 202, 203, 204, and 205, Step 206 may be executed. The execution sequence in FIG. 2 is only an example.

In this solution, the creative experience of the effect profile can be optimized. By introducing the concept of the layer, it is convenient to manage creative materials, reduce understanding costs, shorten creative time, and to some extent stimulate the increase in the production of the effect profile.

In the solution of generating the effect profile according to the embodiments of the present disclosure, the layer list is displayed, where different layers in the layer list indicate different effect materials. The first effect material indicated by the first layer is displayed on the editing interface for the effect material in response to the selection operation for the first layer in the layer list, and the state of the first effect material is adjusted according to the editing operation in response to the editing operation for the first effect material on the editing interface. The sorting of the layers in the layer list is adjusted according to the sorting adjustment operation in response to the sorting adjustment operation for the layer list. The third effect material indicated by the third layer is hidden on the editing interface for the effect material in response to the hiding operation for the third layer in the layer list. The third effect material is hidden when the target image is rendered and presented. The layer list is hidden in response to the hiding trigger operation for the layer list. The effect profile is generated according to the layer list in response to the generation instruction of the effect profile. With the above technical solution, the states of the effect materials of the effect profile is edited and the level order of rendering the effect materials of the effect profile may be adjusted by introducing the layer and the layer list, thereby quickly and conveniently generating the effect profile, reducing understanding costs, shortening the generation time of the effect profile, and improving the production efficiency of the effect profile.

Figure 7:
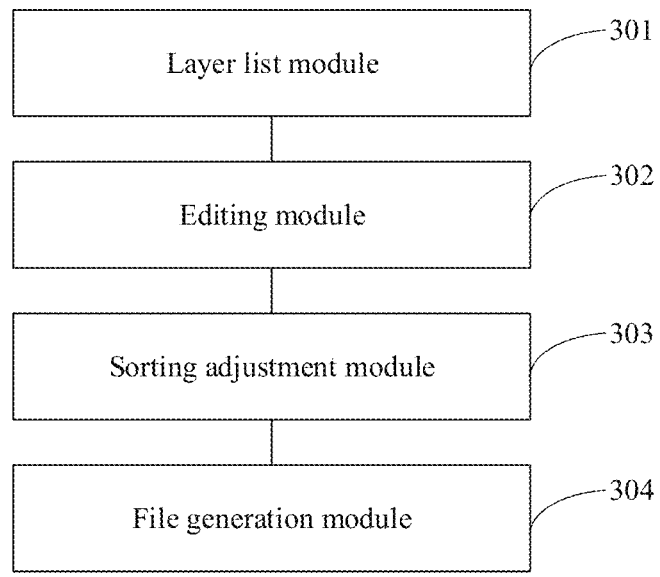
FIG. 7 is a schematic structural diagram of an apparatus for generating an effect profile according to an embodiment of the present disclosure.

FIG. 7 is a schematic structural diagram of an apparatus for generating an effect profile according to an embodiment of the present disclosure. The apparatus may be implemented in software and/or hardware, and may generally be integrated in an electronic device. As shown in FIG. 7, the apparatus includes a layer list module 301, an editing module 302, a sorting adjustment module 303, and a file generation module 304.

The layer list module 301 is configured to display a layer list, where different layers in the layer list indicate different effect materials.

The editing module 302 is configured to display a first effect material indicated by a first layer on an editing interface for the effect material in response to a selection operation of the first layer in the layer list; and adjust a state of the first effect material according to an editing operation in response to the editing operation for the first effect material on the editing interface.

The sorting adjustment module 303 is configured to adjust sorting of layers in the layer list according to a sorting adjustment operation, in response to the sorting adjustment operation for the layer list.

The file generation module 304 is configured to generate the effect profile according to the layer list in response to a generation instruction of the effect profile.

The effect profile is configured to perform effect configuration on an original image in an image capturing process, to add the effect materials of the layers in the layer list onto the original image and generate a captured target image for outputting. In the target image, the effect materials of the layers in the layer list are rendered and presented according to the states of the effect materials of the layers in the layer list. A level order of rendering the effect materials of the layers in the layer list is the same as the sorting of the layers in the layer list.

In one possible implementation, the sorting adjustment module 303 is specifically configured to: adjust sorting of a second layer according to a dragging position of a dragging operation, in response to the dragging operation for the second layer in the layer list, where an adjusted sorting position of the second layer is a dragging position to which the second layer is dragged in the layer list.

In one possible implementation, the editing module 302 is specifically configured to: adjust a state corresponding to an editing component of the first effect material in response to a trigger operation for the editing component corresponding to the first effect material on the editing interface, where the number of editing component is at least one.

In one possible implementation, the editing component includes a trigger component. A state corresponding to the trigger component of the first effect material is a trigger event of the first effect material. The trigger event includes at least one of an appearance action, a disappearance action, and an initial state.

In one possible implementation, the apparatus further includes a material hiding module configured to hide a third effect material indicated by a third layer on the editing interface for the effect material, in response to a hiding operation for the third layer in the layer list. The third effect material is hidden when the target image is rendered and presented.

In one possible implementation, the layer list module 301 is specifically configured to: display the layer list in response to an adding operation for the effect material or a trigger operation for a layer key.

In one possible implementation, the apparatus further includes a list hiding module configured to: hide the layer list in response to a hiding trigger operation for the layer list.

In one possible implementation, the effect material includes at least one of makeup, a filter, a special effect, a sticker, and a text.

The apparatus for generating the effect profile according to the embodiment of the present disclosure may perform the method for generating the effect profile according to any of embodiments of the present disclosure. The apparatus includes the functional modules for implementing the method and has beneficial effects.

A computer program product is also provided according to an embodiment of the present disclosure. The computer program product includes a computer program/instruction. The computer program/instruction, when executed by a processor, performs the method for generating the effect profile according to any embodiment of the present disclosure.

Figure 8:
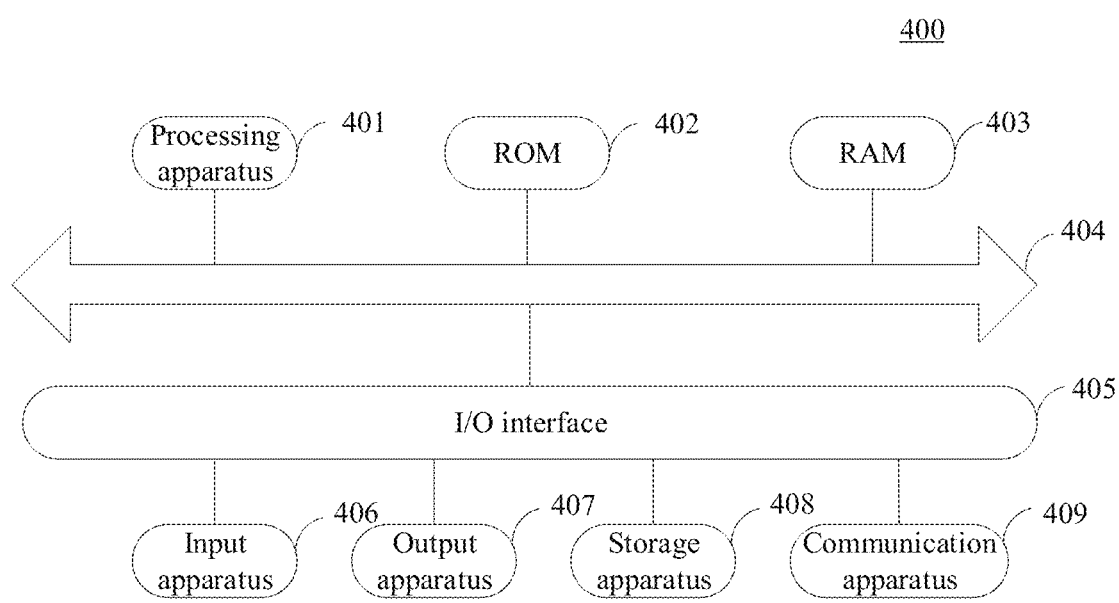
FIG. 8 is a schematic structural diagram of an electronic device according to an embodiment of the present disclosure.

FIG. 8 is a schematic structural diagram of an electronic device according to an embodiment of the present disclosure. Reference is made to FIG. 8 which shows a schematic structural diagram of an electronic device 400 for implementing the embodiments of the present disclosure. The electronic device 400 in the embodiments of the present disclosure may include, but is not limited to, a mobile terminal, such as a mobile phone, a notebook computer, a digital broadcast receiver, a PDA (Personal Digital Assistant), a PAD (Tablet computer), a PMP (Portable Multimedia Player), a vehicle-mounted terminal (such as an in-vehicle navigation terminal), and the like, and a fixed terminal such as a digital TV, a desktop computer, and the like. The electronic device shown in FIG. 8 is only an example, and is not intended to limit functions and scope of the embodiments of the present disclosure.

As shown in FIG. 8, the electronic device 400 may include a processing apparatus 401, such as a central processor or a graphics processor, which may execute various proper operations and processing based on a program stored in a Read Only Memory (ROM) 402 or a program loaded from a storage apparatus 408 into a Random Access Memory (RAM) 403. The RAM 403 is further configured to store various programs and data required by the electronic device 400. The processing apparatus 401, the ROM 402 and the RAM 403 are connected to each other through a bus 404. An Input/output (I/O) interface 405 is also connected to the bus 404.

Normally, an input apparatus 406 such as a touch screen, a touchpad, a keyboard, a mouse, a camera, a microphone, an accelerometer, a gyroscope and the like; an output apparatus 407, such as a liquid crystal display (LCD), a speaker, a vibrator and the like; a storage apparatus 408, such as a magnetic tape, a hard disk and the like; and a communication apparatus 409 may be connected to the I/O interface 405. The communication apparatus 409 enables the electronic device 400 to perform wireless or wired communication with other devices for data exchanging. Although FIG. 8 shows an electronic device 400 having various apparatuses, it should be understood that the illustrated apparatuses are not necessarily required to all be implemented or embodied. Alternatively, more or fewer apparatuses may be implemented or included.

According to the embodiments of the present disclosure, a process described with reference to the flowchart may be implemented by computer software programs. For example, a computer program product is provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 409, or installed from the storage apparatus 408, or installed from the ROM 402. When the computer program is executed by the processing apparatus 401, the functions defined in the method for generating an effect profile according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. More specific examples of the computer readable storage medium may be, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any suitable combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client device and the server may perform communication using any currently known or future developed network protocol such as HTTP (HyperText Transfer Protocol), and may be interconnected with any form or medium of digital data communication (for example, a communication network). Examples of communication networks include local area networks (LAN), wide area networks (WAN), the Internet (e.g., the Internet), and peer-to-peer networks (such as ad hoc peer-to-peer networks), as well as any currently known or future developed network.

The computer readable medium described above may be incorporated in the electronic device, or may exist alone without being assembled into the electronic device.

The computer readable medium mentioned above carries one or more programs. The one or more programs, when executed by the electronic device, cause the electronic device to: display a layer list, where different layers in the layer list are configured to indicate different effect materials; display a first effect material indicated by a first layer on an editing interface for the effect material in response to a selection operation of a first layer in the layer list, and adjust a state of the first effect material according to an editing operation in response to the editing operation for the first effect material on the editing interface; adjust sorting of each layer in the layer list according to a sorting adjustment operation in response to the sorting adjustment operation for the layer list; generate an effect profile according to the layer list in response to a generation instruction of the effect profile. The effect profile is configured to perform effect configuration on an original image in the process of capturing images, so that the effect material of each layer in the layer list is added onto the original image to generate a captured target image for outputting. In the target image, the effect material of each layer in the layer list is rendered and presented according to the state of the effect material on each layer in the layer list. The rendering level order of the effect material of each layer in the layer list is the same as the sorting of each layer in the layer list.

Computer program codes for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or be executed partly on the user computer, or be executed as a stand-alone software package, or be executed partly on the user computer and partly on a remote computer, or be executed entirely on the remote computer or server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block charts in the drawings illustrate the architecture, functions and operations that can be implemented by the system, method and computer program product according to the embodiments of the present disclosure. In this regard, each block in the flowcharts or the block diagram may represent a part of a module, a program section or codes including one or more executable instructions for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the blocks in the block diagram and/or flowchart and a combination of the blocks in the block diagram and/or flowchart may be implemented by a dedicated hardware-based system that performs specified functions or actions, or may be realized by a combination of dedicated hardware and computer instructions.

Units involved in the embodiments of the present disclosure may be implemented by software or hardware. Names of the units do not limit the units in a certain case.

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any suitable combination thereof.

According to one or more embodiments of the present disclosure, a method for generating an effect profile is provided in the embodiments of present disclosure. The method includes:

displaying a layer list, where different layers in the layer list indicate different effect materials;

displaying a first effect material indicated by a first layer on an editing interface for the effect material, in response to a selection operation for the first layer in the layer list; and adjusting a state of the first effect material according to an editing operation, in response to the editing operation for the first effect material on the editing interface;

adjusting sorting of layers in the layer list according to a sorting adjustment operation, in response to the sorting adjustment operation for the layer list; and generating an effect profile according to the layer list in response to a generation instruction of the effect profile, where the effect profile is configured to perform effect configuration on an original image in an image capturing process, to add the effect materials of the layers in the layer list onto the original image and generate a captured target image for outputting; in the target image, the effect materials of the layers in the layer list are rendered and presented according to states of the effect materials of the layers in the layer list, and a level order of rendering the effect materials of the layers in the layer list is the same as the sorting of the layers in the layer list.

According to one or more embodiments of the present disclosure, in the method for generating the effect profile in the embodiments of the present disclosure, the adjusting the sorting of the layers in the layer list according to the sorting adjustment operation, in response to the sorting adjustment operation for the layer list includes:

adjusting sorting of a second layer according to a dragging position of a dragging operation, in response to the dragging operation for the second layer in the layer list, where a adjusted sorting position of the second layer is a drag position to which the second layer is dragged in the layer list.

According to one or more embodiments of the present disclosure, in the method for generating the effect profile in the embodiments of the present disclosure, the adjusting the state of the first effect material according to an editing operation, in response to the editing operation for the first effect material on the editing interface includes:

adjusting a state corresponding to an editing component of the first effect material, in response to a trigger operation for the editing component corresponding to the first effect material on the editing interface, where the number of editing component is at least one.

According to one or more embodiments of the present disclosure, in the method for generating the effect profile in the embodiments of the present disclosure, the editing component includes a trigger component, and the state corresponding to the trigger component of the first effect material is a trigger event of the first effect material, where the trigger event includes at least one of an appearance action, a disappearance action, and an initial state.

According to one or more embodiments of the present disclosure, the method for generating the effect profile in the embodiments of the present disclosure further includes:

hiding a third effect material indicated by a third layer on the editing interface for the effect material, in response to a hiding operation for the third layer in the layer list, where the third effect material is hidden when the target image is rendered and presented.

According to one or more embodiments of the present disclosure, in the method for generating the effect profile in the embodiments of the present disclosure, the displaying the layer list includes:

displaying the layer list in response to an adding operation for the effect material or a trigger operation for a layer key.

According to one or more embodiments of the present disclosure, the method for generating the effect profile in the embodiments of the present disclosure further includes:

hiding the layer list in response to a hiding trigger operation for the layer list.

According to one or more embodiments of the present disclosure, in the method for generating the effect profile in the embodiments of the present disclosure, the effect material includes at least one of makeup, a filter, a special effect, a sticker, and a text.

According to one or more embodiments of the present disclosure, an apparatus for generating an effect profile is provided in the embodiments of present disclosure. The apparatus includes:

a layer list module configured to display a layer list, where different layers in the layer list indicate different effect materials;

an editing module configured to display a first effect material indicated by a first layer on an editing interface for the effect material, in response to a selection operation for the first layer in the layer list; and adjust a state of the first effect material according to an editing operation, in response to the editing operation for the first effect material on the editing interface;

a sorting adjustment module configured to adjust sorting of layers in the layer list according to a sorting adjustment operation, in response to the sorting adjustment operation for the layer list;

a file generation module configured to generate an effect profile according to the layer list in response to a generation instruction of the effect profile; and where the effect profile is configured to perform effect configuration on an original image in an image capturing process, to add the effect material of the layers in the layer list onto the original image and generate a captured target image for outputting; in the target image, the effect materials of the layers in the layer list are rendered and presented according to the states of the effect materials of the layers in the layer list, and a level order of rendering the effect materials of the layers in the layer list is the same as the sorting of the layers in the layer list.

According to one or more embodiments of the present disclosure, in the apparatus for generating the effect profile in the embodiments of present disclosure, the sorting adjustment module is specifically configured to: adjust sorting of a second layer according to a dragging position of a dragging operation, in response to the dragging operation for the second layer in the layer list, where a adjusted sorting position of the second layer is a drag position to which the second layer is dragged in the layer list.

According to one or more embodiments of the present disclosure, in the apparatus for generating the effect profile in the embodiments of present disclosure, the editing module is specifically configured to: adjust a state corresponding to an editing component of the first effect material, in response to a trigger operation for the editing component corresponding to the first effect material on the editing interface, where the number of editing component is at least one.

According to one or more embodiments of the present disclosure, in the apparatus for generating the effect profile in the embodiments of present disclosure, the editing component includes a trigger component, and a state corresponding to the trigger component of the first effect material is a trigger event of the first effect material, where the trigger event includes at least one of an appearance action, a disappearance action, and an initial state.

According to one or more embodiments of the present disclosure, in the apparatus for generating the effect profile in the embodiments of present disclosure, the apparatus further includes a material hiding module configured to: hide a third effect material indicated by a third layer on the editing interface for the effect material, in response to a hiding operation for the third layer in the layer list, wherein the third effect material is hidden when the target image is rendered and presented.

According to one or more embodiments of the present disclosure, in the apparatus for generating the effect profile in the embodiments of present disclosure, the layer list module is specifically configured to: display the layer list in response to an adding operation for the effect material or a trigger operation for a layer key.

According to one or more embodiments of the present disclosure, in the apparatus for generating the effect profile in the embodiments of present disclosure, the apparatus further includes a list hiding module configured to: hide the layer list in response to a hiding trigger operation for the layer list.

According to one or more embodiments of the present disclosure, in the apparatus for generating the effect profile in the embodiments of present disclosure, the effect material includes at least one of makeup, a filter, a special effect, a sticker, and a text.

According to one or more embodiments of the present disclosure, an electronic device is provided in the embodiments of present disclosure. The electronic device includes: a processor; and a memory for storing instructions executable by the processor, where the processor is configured to read the executable instructions from the memory, and execute the instructions to implement the method for generating the effect profile according to any one of the embodiments of the present disclosure.

According to one or more embodiments of the present disclosure, a computer readable storage medium storing a computer program is provided in the embodiments of present disclosure. The computer program is configured to implement the method for generating the effect profile according to the embodiments of the present disclosure.

The above description includes merely preferred embodiments of the present disclosure and explanations of technical principles used. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

In addition, although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. Some features described in a separate embodiment may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. A method for generating an effect profile, comprising:
    displaying a layer list, wherein different layers in the layer list indicate different effect materials;
    displaying a first effect material indicated by a first layer on an editing interface for the effect material, in response to a selection operation for the first layer in the layer list; and
    adjusting a state of the first effect material according to an editing operation, in response to the editing operation for the first effect material on the editing interface;
    adjusting sorting of layers in the layer list according to a sorting adjustment operation, in response to the sorting adjustment operation for the layer list;
    generating the effect profile according to the layer list in response to a generation instruction of the effect profile; and
    wherein the effect profile is configured to perform effect configuration on an original image in an image capturing process, to add the effect materials of the layers in the layer list onto the original image and generate a captured target image for outputting; in the image capturing process, the effect materials of the layers in the layer list are rendered and presented in the target image according to the states of the effect materials of the layers in the layer list and a display state of the first effect material is changed in response to an action of a user, and a level order of rendering the effect materials of the layers in the layer list is the same as the sorting of the layers in the layer list.

2. The method according to claim 1, wherein adjusting the sorting of the layers in the layer list according to a sorting adjustment operation, in response to the sorting adjustment operation for the layer list comprises:
    adjusting sorting of a second layer according to a dragging position of a dragging operation, in response to the dragging operation for the second layer in the layer list, wherein an adjusted sorting position of the second layer is a drag position to which the second layer is dragged in the layer list.

3. The method according to claim 1, further comprising:
    hiding a third effect material indicated by a third layer on the editing interface for the effect material, in response to a hiding operation for the third layer in the layer list, wherein the third effect material is hidden when the target image is rendered and presented.

4. The method according to claim 1, wherein displaying the layer list comprises:
    displaying the layer list in response to an adding operation for the effect material or a trigger operation for a layer key.

5. The method according to claim 1, further comprising:
    hiding the layer list in response to a hiding trigger operation for the layer list.

6. The method according to claim 1, wherein the effect material comprises at least one of makeup, a filter, a special effect, a sticker, and a text.

7. The method according to claim 1, wherein adjusting the state of the first effect material according to the editing operation, in response to the editing operation for the first effect material on the editing interface comprises:
    adjusting a state corresponding to an editing component of the first effect material in response to a trigger operation for the editing component corresponding to the first effect material on the editing interface, wherein the number of editing component is at least one.

8. The method according to claim 7, wherein the editing component includes a trigger component, and a state corresponding to the trigger component of the first effect material is a trigger event of the first effect material, wherein the trigger event includes at least one of an appearance action, a disappearance action, and an initial state.

9. An electronic device, comprising:
a processor; and
a memory for storing instructions executable by the processor,
wherein the processor is configured to read the executable instructions from the memory, and execute the instructions to:
display a layer list, wherein different layers in the layer list indicate different effect materials;
display a first effect material indicated by a first layer on an editing interface for the effect material, in response to a selection operation for the first layer in the layer list; and adjust a state of the first effect material according to an editing operation, in response to the editing operation for the first effect material on the editing interface;
adjust sorting of layers in the layer list according to a sorting adjustment operation, in response to the sorting adjustment operation for the layer list;
generate the effect profile according to the layer list in response to a generation instruction of the effect profile; and
wherein the effect profile is configured to perform effect configuration on an original image in an image capturing process, to add the effect materials of the layers in the layer list onto the original image and generate a captured target image for outputting; in the image capturing process, the effect materials of the layers in the layer list are rendered and presented in the target image according to the states of the effect materials of the layers in the layer list and a display state of the first effect material is changed in response to an action of a user, and a level order of rendering the effect materials of the layers in the layer list is the same as the sorting of the layers in the layer list.

10. The electronic device according to claim 9, wherein the processor is configured to read the executable instructions from the memory, and execute the instructions to:
adjust sorting of a second layer according to a dragging position of a dragging operation, in response to the dragging operation for the second layer in the layer list, wherein an adjusted sorting position of the second layer is a drag position to which the second layer is dragged in the layer list.

11. The electronic device according to claim 9, wherein the processor is configured to read the executable instructions from the memory, and execute the instructions to:
hide a third effect material indicated by a third layer on the editing interface for the effect material, in response to a hiding operation for the third layer in the layer list, wherein the third effect material is hidden when the target image is rendered and presented.

12. The electronic device according to claim 9, wherein the processor is configured to read the executable instructions from the memory, and execute the instructions to:
display the layer list in response to an adding operation for the effect material or a trigger operation for a layer key.

13. The electronic device according to claim 9, wherein the processor is configured to read the executable instructions from the memory, and execute the instructions to:
hide the layer list in response to a hiding trigger operation for the layer list.

14. The electronic device according to claim 9, wherein the effect material comprises at least one of makeup, a filter, a special effect, a sticker, and a text.

15. The electronic device according to claim 9, wherein the processor is configured to read the executable instructions from the memory, and execute the instructions to:
adjust a state corresponding to an editing component of the first effect material in response to a trigger operation for the editing component corresponding to the first effect material on the editing interface, wherein the number of editing component is at least one.

16. The electronic device according to claim 15, wherein the editing component includes a trigger component, and a state corresponding to the trigger component of the first effect material is a trigger event of the first effect material, wherein the trigger event includes at least one of an appearance action, a disappearance action, and an initial state.

17. A non-transitory computer readable storage medium storing a computer program, wherein the computer program, when executed by a processor, causes the processor to:
display a layer list, wherein different layers in the layer list indicate different effect materials;
display a first effect material indicated by a first layer on an editing interface for the effect material, in response to a selection operation for the first layer in the layer list; and adjust a state of the first effect material according to an editing operation, in response to the editing operation for the first effect material on the editing interface;
adjust sorting of layers in the layer list according to a sorting adjustment operation, in response to the sorting adjustment operation for the layer list;
generate the effect profile according to the layer list in response to a generation instruction of the effect profile; and
wherein the effect profile is configured to perform effect configuration on an original image in an image capturing process, to add the effect materials of the layers in the layer list onto the original image and generate a captured target image for outputting; in the image capturing process, the effect materials of the layers in the layer list are rendered and presented in the target image according to the states of the effect materials of the layers in the layer list and a display state of the first effect material is changed in response to an action of a user, and a level order of rendering the effect materials of the layers in the layer list is the same as the sorting of the layers in the layer list.

18. The non-transitory computer readable storage medium according to claim 17, wherein the computer program, when executed by a processor, causes the processor to:
adjust sorting of a second layer according to a dragging position of a dragging operation, in response to the dragging operation for the second layer in the layer list, wherein an adjusted sorting position of the second layer is a drag position to which the second layer is dragged in the layer list.

19. The non-transitory computer readable storage medium according to claim 17, wherein the computer program, when executed by a processor, causes the processor to: adjust a state corresponding to an editing component of the first effect material in response to a trigger operation for the editing component corresponding to the first effect material on the editing interface, wherein the number of editing component is at least one.

20. The non-transitory computer readable storage medium according to claim 19, wherein the editing component includes a trigger component, and a state corresponding to the trigger component of the first effect material is a trigger event of the first effect material, wherein the trigger event includes at least one of an appearance action, a disappearance action, and an initial state.

\* \* \* \* \*